United States Patent [19]
Carton et al.

[11] Patent Number: 4,847,767
[45] Date of Patent: Jul. 11, 1989

[54] DEVICE FOR ELECTRONIC CONTROL OF AN ACTUATOR OF TRANSMISSION DOG CLUTCHES

[75] Inventors: Georges Carton, Corbas; Pierre Kuntz, Bercheres-sur-Vefgre; Yves Drutel, Brignais, all of France

[73] Assignee: Renault Vehicules Industriels, Lyons, France

[21] Appl. No.: 43,451

[22] Filed: Apr. 28, 1987

[30] Foreign Application Priority Data

May 6, 1986 [FR] France ............................. 86 06510

[51] Int. Cl.$^4$ .................. G06F 15/50; G06F 7/70; B60K 41/04
[52] U.S. Cl. ................................. 364/424.1; 74/866
[58] Field of Search ................ 364/424.1; 74/866, 335

[56] References Cited

U.S. PATENT DOCUMENTS

| | | | |
|---|---|---|---|
| 3,896,914 | 7/1975 | Konsbrack et al. | 192/0.02 R X |
| 4,138,632 | 2/1979 | Pauwels et al. | 318/599 |
| 4,364,111 | 12/1982 | Jocz | 361/175 |
| 4,401,986 | 8/1983 | Trenkler et al. | 324/208 X |
| 4,428,248 | 1/1984 | Broucksou et al. | 74/335 |
| 4,466,521 | 8/1984 | Hattori et al. | 192/0.032 |
| 4,570,765 | 2/1986 | Makita | 74/335 |
| 4,718,307 | 1/1988 | Yabe et al. | 74/335 X |

FOREIGN PATENT DOCUMENTS 2572689 5/1986 France .

Primary Examiner—Eugene R. Laroche
Assistant Examiner—Nathan W. McCutcheon
Attorney, Agent, or Firm—Oblon, Spivak, McClelland, Maier & Neustadt

[57] ABSTRACT

A device for the electronic control of an actuator, particularly for transmission dog clutches. The actuator is controlled by two double-acting cylinders, a translation cylinder and a rotation cylinder. Each of the cylinders is associated therewith a system for noting the position of each cylinder, a control system that provides a digital signal representative of the desired position of each cylinder, a digital comparator for producing an error signal as a difference between the desired position and then the actual position, and a digital regulator of the proportional and derivative type which produces an instruction signal to change corresponding solenoid valve. A microprocessor acts with the digital regulator to produce internal storage and programs.

5 Claims, 3 Drawing Sheets

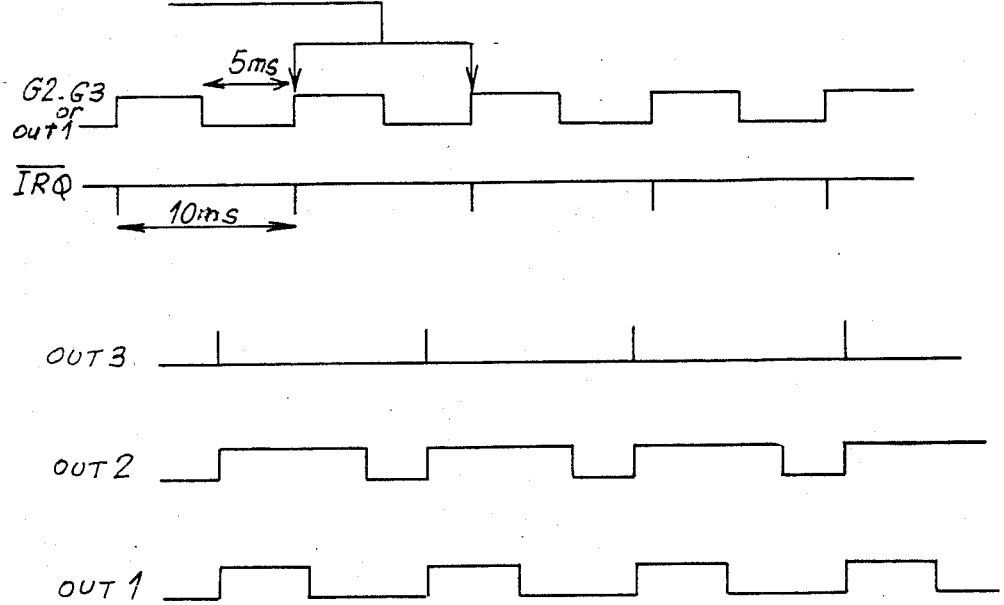
FIG.5
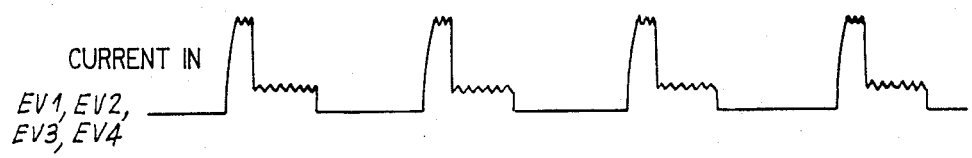
FIG.6
FIG.7

DEVICE FOR ELECTRONIC CONTROL OF AN ACTUATOR OF TRANSMISSION DOG CLUTCHES

BACKGROUND OF THE INVENTION

1. Field of the Invention

The invention relates generally to a device for electronic control of an actuator, and more particularly to the electronic control of an actuator of transmission dog clutches.

2. Discussion of Background

Numerous transmission control devices are known which, with forks mounted on a sliding strip, make it possible to drive the corresponding dog clutch. Other devices rely on electromagnetic or electrohydraulic assemblies. All these assemblies are bulky and increase the number of electrical connections, and the number of control cylinders.

SUMMARY OF THE INVENTION

The object of this invention is to propose a device for electronic control of a single actuator, which applies particularly to the control of transmission dog clutches and which uses two operating cylinders to reduce the amount of status data. This electronic control device must be as accurate as possible while making possible a relatively frequent updating of the position data.

According to an embodiment of the invention, the device for electronic control of an actuator, particularly for transmission dog clutches, controlled by two double-acting cylinders, a translation cylinder and a rotation cylinder, comprises in combination for each of the cylinders:

a system for copying the position of each of the cylinders that provides a digital signal representative of the position;

a control system that provides a digital signal representative of each of the translation and rotation instructions of the corresponding cylinder;

a digital comparator that produces a digital error signal as the difference between the two preceding signals;

a digital regulator of proportional and derivative type that, with a microprocessor, produces internal storages and programs, and from the preceding error signal produces an instruction signal for the corresponding solenoid valve.

According to an embodiment of the invention, the copying system comprises an inductive linear sensor with a plunger core solid with the feeler, said inductive linear sensor being connected to an oscillator translating the position of the feeler into a variable frequency signal and, finally a counting device which transforms said variable frequency signal into a digital signal.

According to an embodiment of the invention, the digital regulator produces a control instruction signal with gains selected in storage as a function of the forces to be overcome, and thresholds taking into account the nonlinearity of the system, said instruction signal furnished by the digital regulator to the corresponding solenoid valve consisting of a chopped current of variable cyclic ratio.

According to an embodiment of the invention, a call-hold interface is placed upstream from the corresponding solenoid valve so that for each control the signal comprises a very high intensity call current followed by a low intensity hold current to limit the energy to be switched over.

According to an embodiment of the invention, the microprocessor compares the sensor data corresponding to a mechanical stop with data residing in storage and which serves as a temperature reference, the measured derivative being put in storage and making it possible to correct accordingly all the position instructions to be attained.

According to an embodiment of the invention, the copying system comprises a mechanical reducing gear consisting of a tapered element solid with the rod of the cylinder, the feeler being applied to said tapered element.

The electronic control device according to the invention thus exhibits the advantage of limiting the number of sensors and electrical connections. Moreover, it facilitates the adjustments of the sensors during assembly and automatically adapts as a function of the derivatives of the sensors due particularly to the temperature.

BRIEF DESCRIPTION OF THE DRAWINGS

The invention will be better understood by the study of particular embodiment described by way of a nonlimiting example and illustrated by the accompanying drawings in which:

FIG. 5 is a graph representing the evolution, as a function of time, of the copying system;

FIG. 6 is a graph representing the evolution, as a function of time, of the system for controlling the solenoid valves;

FIG. 7 is a graph representing the evolution of the current intensity controlling the solenoid valves.

DESCRIPTION OF THE PREFERRED EMBODIMENTS

Figures 1, 2:
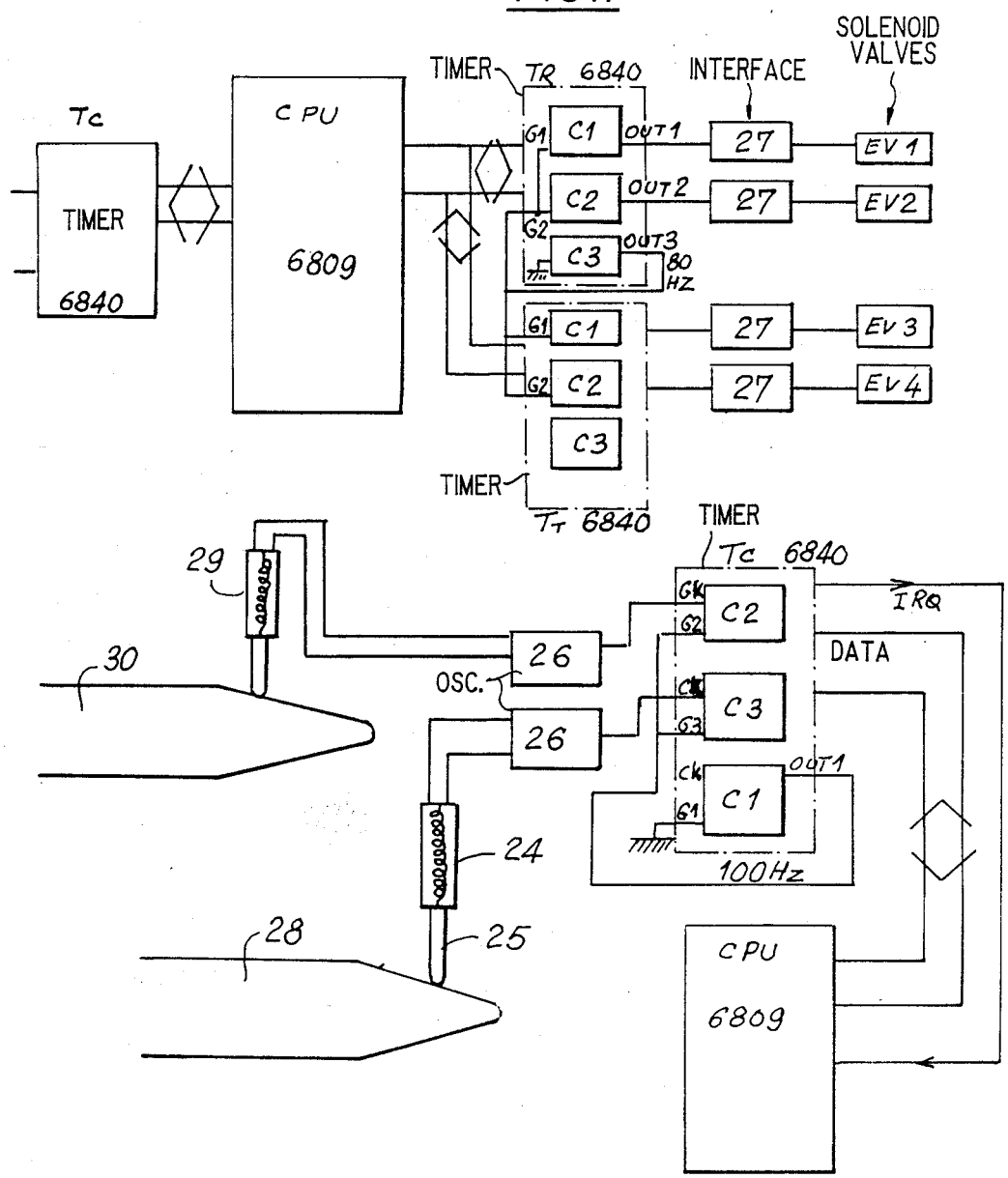
FIG. 1 is the overall diagram of the electronic control device according to the invention.
FIG. 2 is the diagram of the copying system.

Various other objects, features and attendant advantages of the present invention will be more fully appreciated as the same becomes better understood from the following detailed description when considered in connection with the accompanying drawings in which like reference characters designate like or corresponding parts throughout the several views.

The device for electronic control of a single actuator, not shown in the figures, applies particularly to the control of transmission dog clutches. To do this, two double-acting cylinders are required: a translation cylinder 5 and a rotation cylinder 6.

Figure 3:
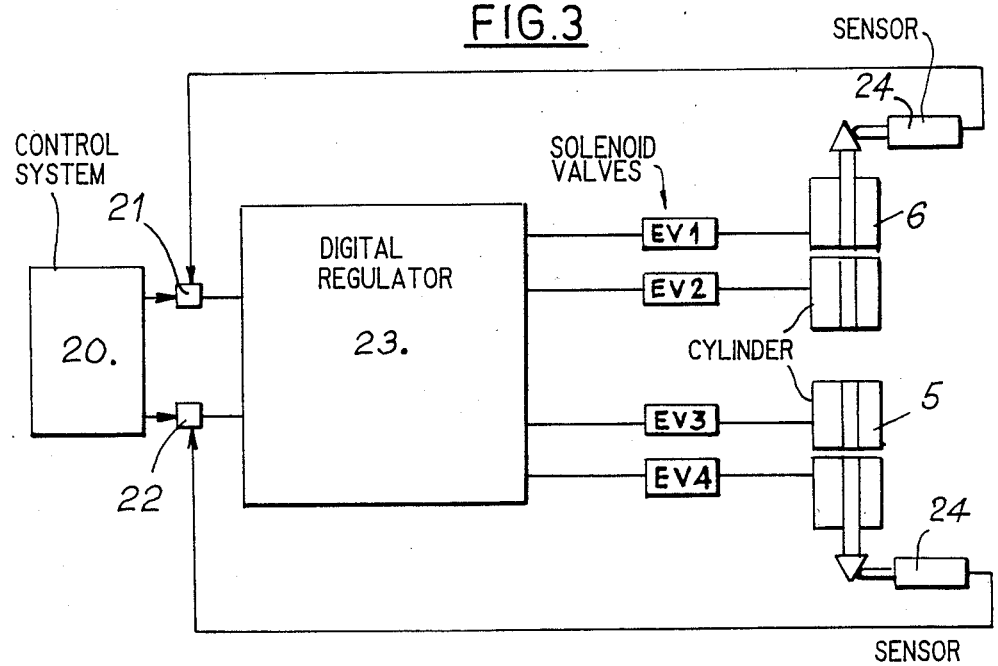
FIG. 3 is the diagram of the servocontrol.

Each of cylinders 5 and 6 comprise in combination, as can be seen in FIG. 3, a device for electronic control of an actuator, particularly for transmission dog clutches, controlled by two double-acting cylinders, a translation cylinder 5 and a rotation cylinder 6, each of the cylinders being characterized by:

a system for copying the position of each of cylinders 5 and 6 the provides a digital signal representative of the position;

a control system 20 that provides a digital signal representative each of the translation and rotation instructions of the corresponding cylinder;

a digital comparator 21 and 22 that produces a digital error signal as difference between the two preceding signals;

a digital regulator 23 of the proportional and derivative type that, with a microprocessor, produces internal storages and programs, and from the preceding error signal produces an instruction signal of the corresponding solenoid valve.

The copying system comprises a position sensor for each of cylinders 5 and 6, as shown in FIG. 2.

The position sensor used is an inductive linear sensor 24 with a plunger core composed of a mobile part on which is found a ferrite, and a stationary part on which is found the winding of the sensor.

By movement of the mobile part, the ferrite enters into the winding and modifies the value of its inductance.

This variable inductance is connected to an oscillator 26 which delivers a square signal whose frequency variation can reach 200 KHz over the entire travel of the cylinder.

Sensors 24 and 29 make it possible to gather linear data over 10 mm, knowing that its total travel is 16 mm.

Since the distance to be measured is 30 mm, it was necessary to make a mechanical reducing gear on which feeler 25 of sensor 24 rests.

The mechanical reducing gear consists of a tapered element 28 or 30 solid with the rod of cylinder 5 or of cylinder 6.

The device comprises a central processing unit CPU 30 consisting, for example, of a 6809 microprocessor with an EPROM read-only memory and a RAM random access memory and also a Timer TC consisting, for example, of 6840 integrated circuits.

Timer TC has 3 counters C1, C2, C3 each with an input CK, and a gate G1, G2 and G3, respectively.

The processing is thus performed by the 6809 microprocessor, via a 6840 Timer. It consists of a frequency measurement. The counted-down value at each sampling period is read into counters C2 and C3 of Timer TC.

The count-down frequency is 1.5 MHz.

To obtain a sufficient number of points over the travel of sensor 24 and 29 and especially to be able to have derived data available on this signal, the sampling period was fixed at Tech=10 ms.

Counter C1 of Timer TC generates the sampling frequency with its output OUT 1.

Counters C2 and C3 of Timer TC function as frequency comparators. They generate an interrupt at each rising front on their respective gate G2 and G3.

In this measuring system, the accuracy obtained on reading sensors 24 and 29 depends only on the duration of the sampling period. Therefore, it is a compromise between the speed of the data refresh operation and the number of points desired on the measurement that it has been necessary to find. With an interrupt $\overline{IRQ}$ every 10 ms, the sensor data is refreshed at least once between two controllings of solenoid valves at 80 Hz, the derived data takes significant values and the number of points available over the entire travel of the cylinder is then on the order of 800 points.

This period of 10 ms makes it possible to obtain enough steps while not delaying the acquisition of the signal too much.

The behavior of the oscillator 26-sensor 24 or 29 unit is satisfactory in temperature, the frequency variation being on the order of 1% for a temperature variation of 100° C. However, if it is desired to maintain the same accuracy on the sensor regardless of the temperature, it is necessary to compensate for this variation.

Therefore, it is not possible to mark once and for all, and in an absolute way, the positions of the various dog clutches.

To take into account the influence of temperature, the microprocessor compares the sensor data corresponding to a mechanical stop to data residing in storage which serves as a reference. The measured derivative is put into storage and makes it possible to correct accordingly all the instructions of positions to be attained.

All these positions to be servocontrolled were put in storage for a given temperature, they are updated, first at the beginning, then cyclically at each stable and relatively long phase of the transmission. Since the system is mechanically rigid, and each position to be attained is referenced by a pair of values, it is therefore enough to measure the derivative on this pair and to recompute all the others relative to the new reference found. Thus, the system knows how to correct the influence of temperature.

A standard system uses as many double-acting cylinders as dog clutches and must have data available in clutched position and data in declutched position (or 2 contacts per dog clutch).

Each contact, i.e., 12 in the case of six dog clutches must be positioned very accurately so as to collect the data of position attained at the right moment; which makes 12 precise adjustments to be performed.

The device that we describe requires only two relatively rough positionings of the two sensors 24 and 29 for copying of position. Actually, each of sensors 24 and 29 have a relatively broad adjustment range; it is enough to tighten it until it is found. The microprocessor then enters into a learning phase where is knows how to recognize all the positions of the dog clutches to be attained, these positions are put in storage in the form of pairs of values. This method thus makes it possible to personalize each electronic unit to the vehicle on which it is mounted.

The solenoid valves are referenced respectively EV1, EV2 for rotation cylinder 6 and EV3, EV4 for translation cylinder 5.

Figure 4:
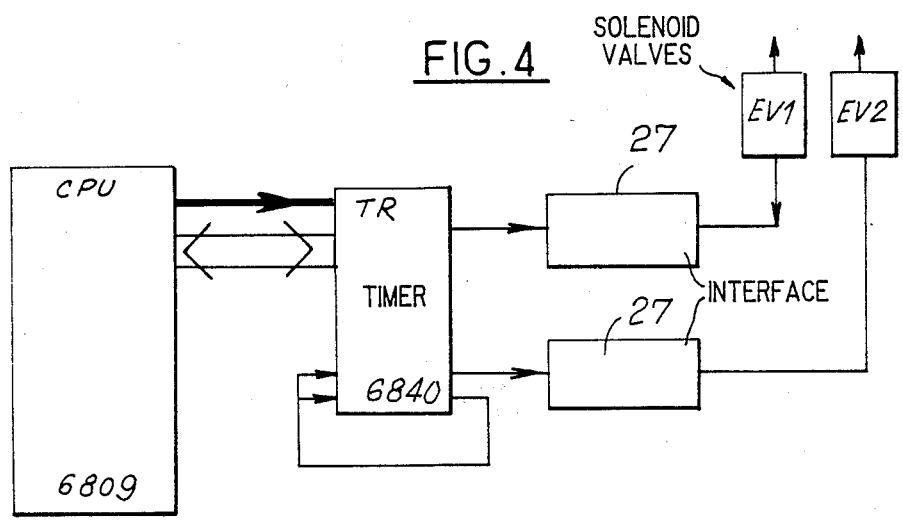
FIG. 4 is the diagram of the system for controlling the solenoid valves.

As shown in FIGS. 1 and 4, the unit for controlling the solenoid valve for each of cylinders 5 and 6 comprises a digital regulator 23 which produces a control instruction signal with gains selected in storage as a function of the forces to be overcome, and thresholds taking into account the nonlinearity of the system, said instruction signal furnished by digital regulator 23 to the corresponding solenoid valve (EV1, EV2, EV3, EV4) consisting of a chopped current of variable cyclic ratio.

Each solenoid valve is controlled at a fixed frequency and variable cyclic ratio. A call-hold interface 27 is placed upstream from each solenoid valve (EV1, EV2, EV3, EV4), to reduce its off time and its on response time. To reduce its off time, each control receives a very strong call current (I=3A). To decrease its on response time the hold current is limited to (I=0.4A). With this type of control, it is possible to control these solenoid valves at a frequency of 80 Hz. The available delivery upstream from the solenoid valve, in a limited range, is directly proportional to the control cyclic ratio.

The control time is determined at each computation loop by the microprocessor. The latter makes possible the loading of the corresponding counter, i.e., of Timer TR for solenoid valves EV1 and EV2 and of Timer $T_T$ for solenoid valves EV3 and EV4. These Timers consist, for example, of 6840 integrated circuits.

Counter C3 of Timer TR generates a fixed frequency signal (80 Hz), this signal OUT 3 activates gates G1 and G2 of counters C1 and C2 of Timer TR, which operate as monostable. Each rising front on the gate of counters C1 and C2 triggers the monostable. Outputs OUT 1 and OUT 2 remain in the high state until full count-down of the corresponding counter. Since the count-down frequency is 1.5 MHz, the duration of the high state is equal to N/fH where N is the loading value of the counter and fH the clock frequency. FIGS. 5 and 7 graphically show the timing relationship of these signals It is the same for Timer $T_T$.

In the case of a progressiveness extending to 8 ms, which corresponds to a control at 80 Hz, the number of control steps is then:

$N = T \times fH$ where T is the control time
$N = 8 \times 10^{-3} \times 1.5 \times 10^6$
N = 12,000 steps In order for this control to be perfectly progressive, the electrohydraulic servocontrol, is of the derived-proportional type making it possible in any case to obtain a quick and stable response. The use of the derivative is made very easy by the processing of sensor 24 previously described. It is equal to the difference between two successive samples divided by the sampling period.

The servocontrol obviously has the role of evaluating the control magnitudes of each solenoid valve, EV1, EV2, EV3, EV4 as a function of the error which exists between the instruction to be attained and the value of the position of the cylinder. All the various transfer functions of the system have been identified to find, for each one, the gains and thresholds making it possible to obtain a good response.

The servocontrol is therefore called by program with certain parameters (thresholds and gains) which are selected in storage as function of the starting position of the single actuator and of the path to be traveled to attain the position corresponding to the new instruction.

There are various cases to be dealt with by the servocontrol.

The first two cases to be dealt with take into account the two different cylinders to be controlled.

For rotation cylinder 6:

When rotation cylinder 6 is placed horizontally, it exhibits the same transfer function regardless of the direction of control. It can therefore be servocontrolled in position in the same way regardless of the line of the error.

For translation cylinder 5:

Translation cylinder 5 is placed vertically. In this case, the weight of the cylinder renders the system asymmetrical, so that it is necessary to compensate for this asymmetry by various thresholds and gains depending on whether it is guided in one direction or the other.

The two other cases to be dealt with take into account the force to be overcome.

For movement without force:

In the case where the actuator moves freely between the two levels of dog clutches to be positioned opposite a fork, it is practically subjected to no force. Stability in this case is obtained with relatively low gains. Therefore, as soon as the translation instruction is in the neutral position range, the microprocessor will look in storage for the gains corresponding to a very slight resistant force.

For movement with force:

In translation, the cylinder is subjected to a resistant force when it moves from the neutral to the forks, because in this case, it must retract the safety pin, i.e., depress the spring which holds it in output position.

In rotation, the cylinder should also struggle against a resistant force when it must move the forks of the dog clutches. In this case, it must be able to have all the hydraulic power available. Each position to be servocontrolled can be located on a plane by an abscissa and an ordinate. And at each zone of this plane correspond four values in the form of two pairs which are ($K_{DROT}$, $K_{PROT}$) and ($K_{DTRA}$, $K_{PTRA}$).

Moreover, in the case of the controlling of the translation cylinder, it is necessary to identify the sign of the error so as to be able to compensate for the weight of the cylinder by various gains ($K_{DTRA+}$, $K_{PTRA+}$) and ($K_{DTRA-}$, $K_{PTRA-}$) and a compensation value ($V_{COMP}$) on the threshold.

$K_{PROT}$ is the proportional coefficient in rotation $K_{DROT}$ is the derived coefficient in rotation $K_{PTRA+}$ is the proportional coefficient upward in translation $K_{PTRA-}$ is the proportional coefficient downward in translation $K_{DTRA+}$ is the derived coefficient, upward in translation $K_{DTRA-}$ is the derived coefficient, downward in translation $V_{COMP}$ is the compensation value to counteract the effect of the weight of the cylinder.

The servocontrol thus furnishes a time $T_i$ which is the control time of solenoid valve $EV_i$.

Digital comparators 21 and 22 produce a digital error signal $\epsilon_1$ and $\epsilon_2$.

If $\epsilon_1 > 0$, one has $T_1 = K_{PROT} \times \epsilon_1 + K_{DROT} \times \frac{\Delta \epsilon_1}{\Delta T} + T_{mini}$ $T_2 = T_{mini}$ If $\epsilon_1 = 0$, one has $T_1 = T_2 = T_{mini}$ If $\epsilon_1 < 0$, one has $T_1 = T_{mini}$ $T_2 = K_{PROT} \times \epsilon_1 + K_{DROT} \times \frac{\Delta \epsilon_1}{\Delta T} + T_{mini}$ $T_3 = (K_{PTRA+}) \times \epsilon_2 + (K_{DTRA+}) \times \frac{\Delta \epsilon_2}{\Delta T} + T_{mini} + V_{COMP}$ $T_4 = T_{mini} + V_{COMP}$ If $\epsilon_2 = 0$, one has $T_3 = T_{mini} + V_{COMP}$ and $T_4 = T_{mini}$ If $\epsilon_2 < 0$, one has $T_3 = T_{mini} + V_{COMP}$ $T_4 = (K_{PTRA-}) \times \epsilon_2 + (K_{DTRA-}) \times \frac{\Delta \epsilon_2}{\Delta T} + T_{mini}$ $T_{mini}$ being the response time of the solenoid valve.
We claim:

1. Device for electronic control of an actuator for transmission dog clutches, controlled by two double-acting cylinders, a translation cylinder and a rotation cylinder, said device comprising for each of the cylinders:
- a system for copying the position for each of the cylinders that provides a digital signal representative of the position;
- a control system that provides a digital signal representative of each of the translation and rotation instructions of the corresponding cylinder;
- a digital comparator producing a digital error signal as a difference between the two preceding signals;
- a digital regulator of proportional and derivative type that, with a microprocessor, produces internal storage and programs, and from the preceding error signal produces an instruction signal for the corresponding solenoid valve;
- wherein a call-hold interface is located upstream from the corresponding solenoid valve so that for each control the signal comprises a very high intensity call current followed by a low intensity hold current to limit the energy to be switched over.

2. Device according to claim 1, wherein the system for copying comprises an inductive linear sensor with a plunger core fixed with a feeler, said inductive linear sensor being connected to an oscillator translating the position of the feeler into a variable frequency signal, and a counting device which transforms said variable frequency signal into a digital signal.

3. Device according to claim 1, wherein the digital regulator produces a control instruction signal with gains selected from values in storage as a function of the forces to be overcome, and thresholds taking into account the nonlinearity of the system, said instruction signal furnished by the digital regulator to the corresponding solenoid valve said instruction signal consisting of a chopped current of variable cyclic ratio.

4. Device according to claim 1, wherein the microprocessor compares the sensor data corresponding to a mechanical stop with data residing in storage to serve as a temperature reference, the measured derivative being put in storage and so as to correct accordingly all the position instructions to be attained.

5. Device according to claim 2, wherein the system for copying comprises a mechanical reducing gear consisting of a tapered element fixed with the rod of the cylinder; the feeler being applied to said tapered element.

* * * * *